United States Patent [19]
Teraoka et al.

[11] Patent Number: 5,711,737
[45] Date of Patent: Jan. 27, 1998

[54] DIFFERENTIAL APPARATUS

[75] Inventors: Masao Teraoka; Osamu Ishikawa; Satoshi Aiba; Kenji Hiraishi, all of Tochigi-ken, Japan

[73] Assignee: Tochigi Fuji Sangyo Kabushiki Kaisha, Tochigi-ken, Japan

[21] Appl. No.: 554,453

[22] Filed: Nov. 7, 1995

[30] Foreign Application Priority Data

Sep. 11, 1994 [JP] Japan ................................. 6-274825
Apr. 14, 1995 [JP] Japan ................................. 7-089504

[51] Int. Cl.⁶ .................................................. F16H 01/45
[52] U.S. Cl. ........................................ 475/160; 475/252
[58] Field of Search ................................ 475/159, 160, 475/248, 252

[56] References Cited

U.S. PATENT DOCUMENTS

| | | | |
|---|---|---|---|
| 5,209,707 | 5/1993 | Teraoka | 475/159 X |
| 5,244,440 | 9/1993 | Ichiki . | |
| 5,282,775 | 2/1994 | Teraoka | 475/248 X |
| 5,295,923 | 3/1994 | Takefuta | 475/160 X |
| 5,389,048 | 2/1995 | Carlson | 475/248 X |
| 5,415,601 | 5/1995 | Cilano | 475/248 X |
| 5,458,546 | 10/1995 | Teraoka | 475/248 |

FOREIGN PATENT DOCUMENTS

| | | | |
|---|---|---|---|
| 563895-A1 | 10/1993 | European Pat. Off. | 475/252 |
| 0 622 569 | 11/1994 | European Pat. Off. . | |
| 94/27063 | 11/1994 | WIPO | 475/160 |

Primary Examiner—Khoi Q. Ta
Assistant Examiner—Peter T. Kwon
Attorney, Agent, or Firm—Jones & Askew, LLP

[57] ABSTRACT

A differential apparatus includes a differential casing, a pair of side gears and plural pairs of pinion gears. The pinion gears are accommodated in bores formed in the differential casing, respectively. On the side wall of the differential casing a plurality of lubrication holes are formed for introducing the lubrication oil into the differential casing. Each lubrication hole is arranged so that a center thereof is positioned in the vicinity of a meshing point of the pinion gears. In operation, due to the screw pumping effect of the pinion gears, plenty of lubrication oil is introduced into meshing portions of the pinion gears.

4 Claims, 6 Drawing Sheets

1

DIFFERENTIAL APPARATUS

BACKGROUND OF THE INVENTION

The present invention relates to a differential apparatus used for a vehicle or the like and more particularly, it relates to a lubricating structure of the differential apparatus.

In a prior art, a differential apparatus as shown in FIG. 1 is disclosed in the U.S. Pat. No. 5,244,440. In the shown differential apparatus 101, respective pairs of helical pinion gears 103, 105 are so adapted that meshing parts thereof are outside a pair of helical side gears 107, 109 in the axial direction in the differential apparatus of that type, owing to the arrangement, it is possible to support the pinion gears securely and miniaturize and lighten the apparatus. Furthermore, by effective use of friction between the pinion gears 103, 105 and other friction between the respective gears and casing 111, 112, 113, it is also possible to smooth a differential limiting operation of the apparatus and realize larger differential limiting force.

In the above mentioned differential apparatus 101, however, there are problems of seizure phenomenon of the gears and pitching action thereof in case of insufficiency in lubrication, due to an arrangement where the differential limiting force is attained by relative sliding movements among the gears and between the respective gears and the casings. The seizure problem is remarkable in sliding (frictional) areas where end faces of the pinion gears abut on inner walls 111a, 113a of the casings by thrust force applied on the pinion gears 103, 105.

In order to measure such problems, U.S. Pat. No. 3,310,389 discloses a differential apparatus where the differential casing has radial lubrication orifices formed radially outward of meshing sections of the pinion gears, as shown in FIG. 2. In this differential apparatus 201, the lubricating oil can be introduced to the meshing sections of the pinion gears directly through the lubrication orifices 203, 205. In such an arrangement where the orifices 203, 205 are formed on the periphery of the casing 207, however, it is expected that a level of oil stored in a not-shown oil carrier is lowered by rotation of the differential casing 207 during a vehicle's traveling, so that it is impossible to supply the lubricating oil to sliding sections sufficiently. Therefore, the differential apparatus still contains the above problem of running out of lubrication oil, which may be caused on end surfaces 209, 211 of the pinion gears.

SUMMARY OF THE INVENTION

It is therefore an object of the present invention to provide a differential apparatus which is capable of supplying the lubrication oil to meshing portions and sliding areas of the pinion gears securely and sufficiently.

The object of the invention described above can be accomplished by a differential apparatus comprising:

a differential casing rotated by a driving force of an engine;

a pair of side gears aged in the differential casing, opposing to each other and rotatably supported in coaxial with an axis of the differential casing;

at least one pair of bores formed about the side gears in the differential casing so as to extend in parallel with the axis of the differential casing, the bores being composed of a first bore and a second bore arranged so as to communicate with the first bore partially; and at least one pair of pinion gears, the pinion gears being composed of a first pinion gear rotatably accommodated in the first bore to mesh with one of the side gears and a second pinion gear rotatably accommodated in the second bores to mesh with the other side gear, the first and second pinion gears meshing with each other, wherein the differential casing is provided on a side wall thereof with a lubrication hole of which center is positioned in the vicinity of a meshing point of the pinion gears, whereby meshing portions of the pinion gears is communicated with the outside of the differential casing.

With the arrangement mentioned above, plenty of lubrication oil is supplied to the meshing portions and sliding areas of the pinion gears through the lubrication hole, whereby the problem of seizure and pitching of the respective pinion gears and side gears can be solved.

In the present invention, preferably, the first pinion gear meshes with the second pinion gear outside the side gears in the axial direction of the differential casing.

More preferably, an outer diameter of the lubrication hole is established so as to be within a range of 40 to 95 percent of an outer diameter of each of the pinion gears.

According to the present invention, there is also provided a differential apparatus for a vehicle comprising:

a differential casing related by a driving force of an engine;

a pair of side gears arranged in the differential casing, opposing to each other and rotatably supported in coaxial with an axis of the differential casing;

at least one pair of bores formed about the side gears in the differential casing so as to extend in parallel with the axis of the differential casing, the bores being composed of a: first bore and a second bore arranged so as to communicate with the first bore partially; and at least one pair of pinion gears, the pinion gears being composed of a first pinion gear rotatably accommodated in the first bore to mesh with one of the side gears and a second pinion gear rotatably accommodated in the second bores to mesh with the other side gear, the first and second pinion gears meshing with each other, wherein the pair of bores are arranged so that when the vehicle is traveling forward, the first bore rotates in advance of the second bore in the rotating direction of the differential casing;

wherein the differential casing is provided with a lubrication hole which communicates the outside of the differential casing with the first bore.

With the rotation of the differential casing, the lubrication oil is firstly introduced into the first bore and sequentially, it is introduced into the second bore by the centrifugal force of the differential casing. Thereafter, the lubrication oil reaches tooth surfaces of the side gears, so that respective gear portions thereof and sliding areas can be lubricated securely thereby to prevent them from seizing.

In the present invention mentioned above, preferably, the first pinion gear consists of a first gear portion meshing with the second pinion gear, a second gear portion meshing with one of the side gears, and an axle portion so connecting the first gear portion with the second gear portion, the axle portion having an outer diameter smaller than that of the first and second gear portions and the lubrication hole is arranged in the vicinity of the axle portion.

More preferably, the differential casing is provided on a side wall thereof with another lubrication holes opposing to respective end faces of the first and second pinion gears.

These and other objects and features of the present invention will become more fully apparent from the follow-

DESCRIPTION OF THE PREFERRED EMBODIMENT

Embodiments are now described with reference to drawings.

Figure 1:
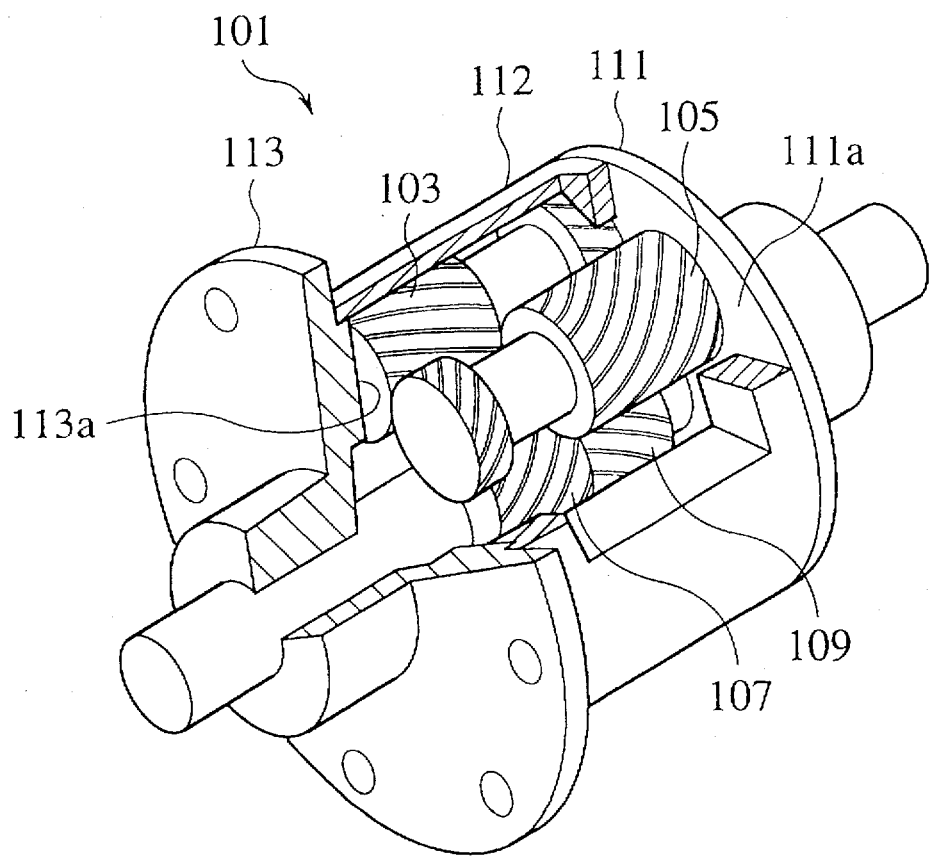
FIG. 1 is a perspective view of the conventional differential apparatus.
Figure 2:
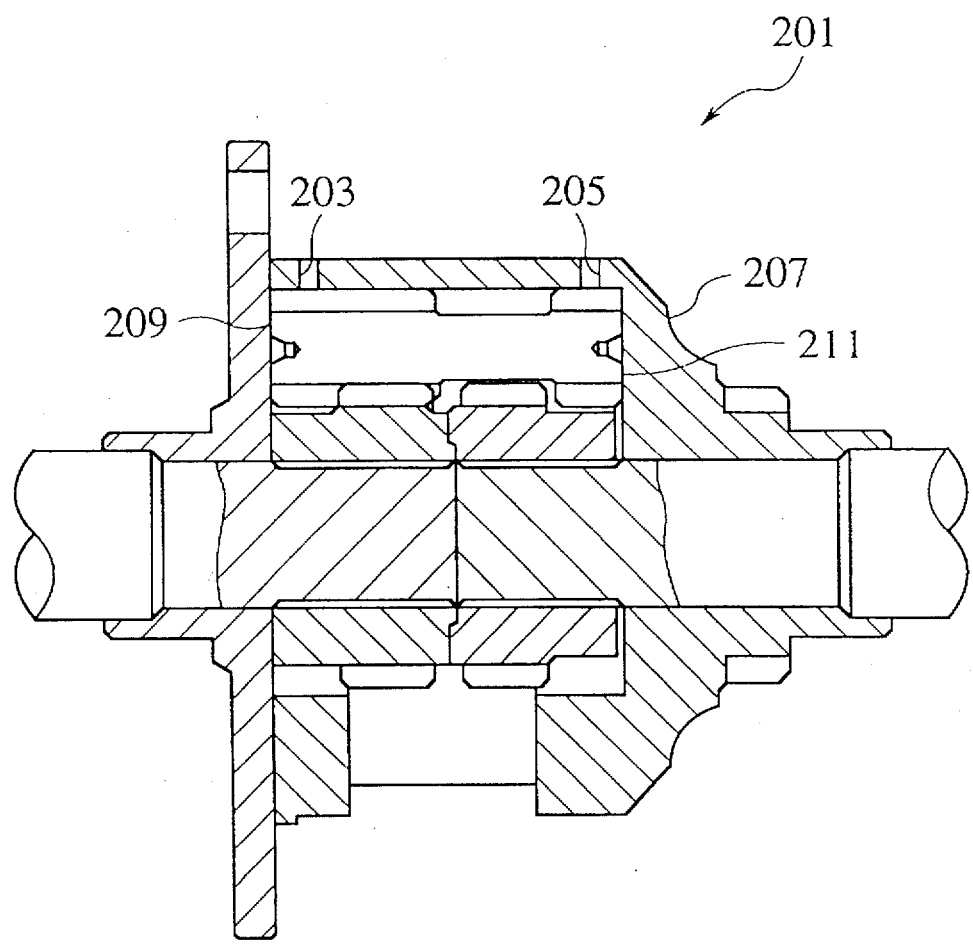
FIG. 2 is a cross sectional view of another conventional differential apparatus.
Figure 3:
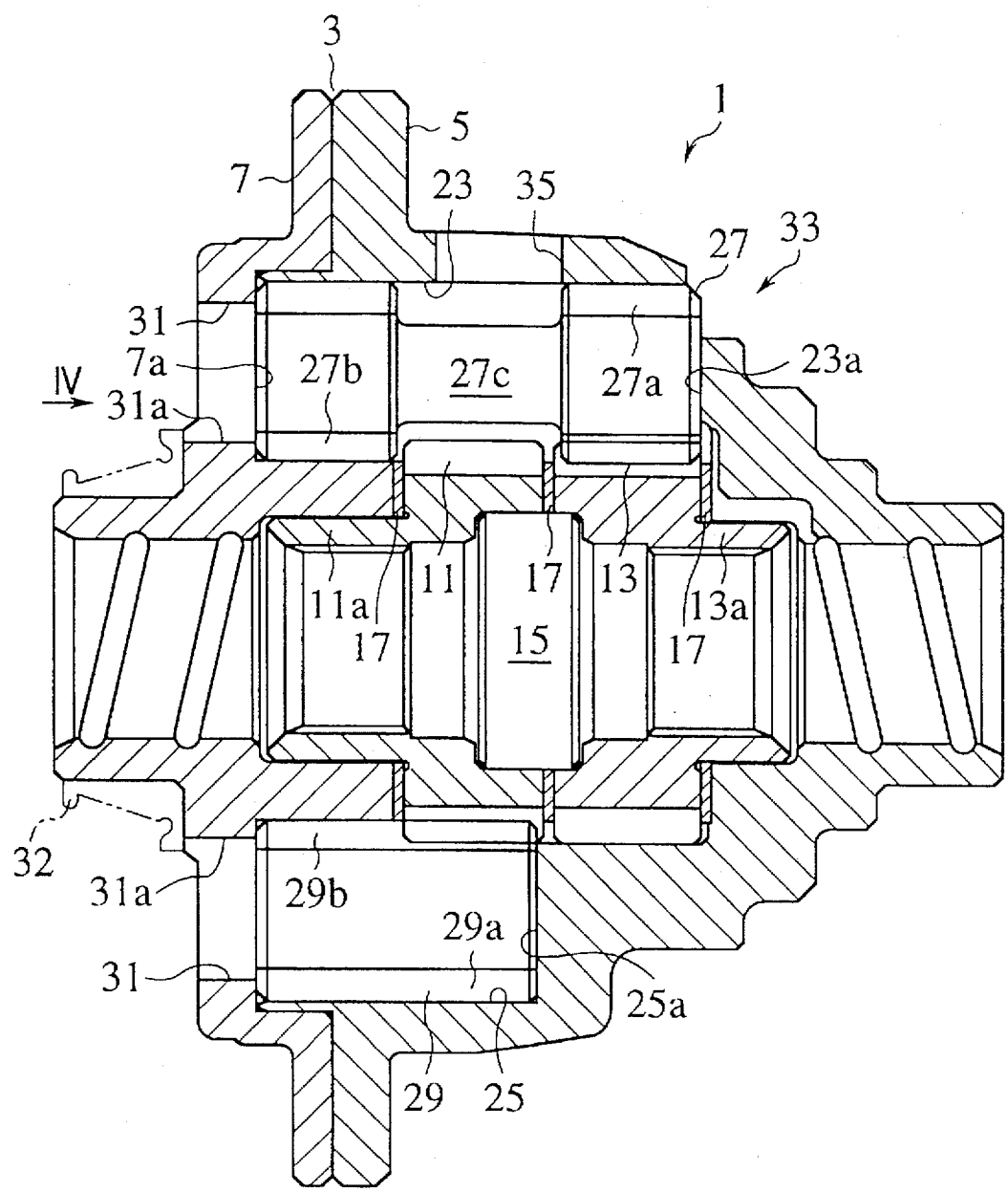
FIG. 3 is a cross sectional view showing a differential apparatus in accordance with a first embodiment of the present invention.
Figure 4:
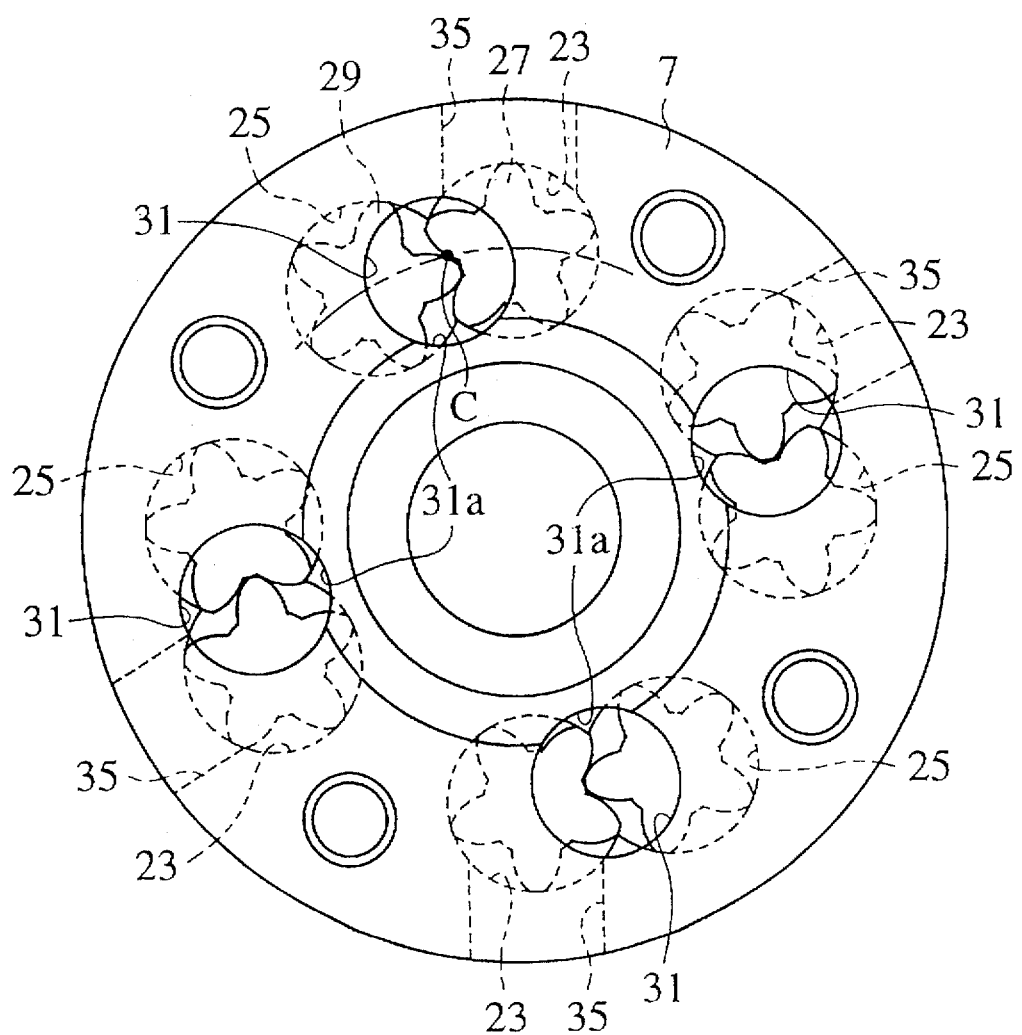
FIG. 4 is a side view of the differential apparatus, viewed from a direction of arrow IV of FIG. 3.

FIG. 3 is a cross sectional view of a differential apparatus in accordance with the first embodiment of the present invention, in which respective pinion gears are contained in upper and lower half sections of the drawing, respectively, in combination with cross sectional views of lubrication orifices. FIG. 4 is a side view of the differential apparatus viewed from a direction of arrow IV of FIG. 3.

As similar to the conventional apparatus, the differential apparatus 1 is formed to be of parallel-axle type and rotatably supported in a not-shown differential carrier having an oil reservoir through bearings, so that the whole apparatus 1 is immersed in an oil bath.

As shown in FIG. 3, a differential casing 3 is composed of a casing body 5 and a cover 7 connected thereto through not-shown bolts. A first helical side gear 11 (on the left side in the figure) and a second helical side gear 13 (on the right side in the figure) are accommodated in the differential casing 3, having respective hub portions 11a, 13a rotatably supported by the differential casing 3. Arranged between the helical side gears 11, 13 are a thrust block 15 which serves to restrict movements of not-shown left and right drive shafts in the mutual approaching direction. Further, washers 17, 17, 17 are arranged between the sides gear 11 and the other side gear 13 and between the respective side gears 11, 13 sad the differential casing 3. At inner peripheries of the hub portions 11a, 13a, the helical side gears 11, 13 are spline-coupled to the left and right drive shafts, respectively.

Along outer peripheries of the side gears 11, 13, the casing body 5 has four pairs of bores formed so as to extend in parallel with a rotational axis of the drive shafts. Each pair of bores are composed of a first bore 23 (longer one) and a second bore 25 (shorter one). In each of the first bores 23, a first helical pinion gear 27 of long sized is accommodated so as to frictionally rotate therein while a second helical pinion gear 29 of short sized is accommodated so as to frictionally rotate in each of the second bores 25. The first pinion gear 27 consists of a gear portion 27a arranged on the right hand in FIG. 3, another gear portion 27b arranged on the left hand in the figure and an axle portion 27c connecting the gear portion 27a with the gear portion 27b. In arrangement, the gear portion 27a is adapted so as to mesh with the fight side gear 13 while the gear portion 27b is adapted so as to mesh with a left gear portion 29b of the short pinion gear 29. Further, a right gear portion 29a of the short pinion gear 29 is arranged so as to mesh with the left side gear 11.

In this way, meshing with each other outside the side gear 11 in the axial direction, the pinion gears 27, 29 serve to connect the side gear 11 with the side gear 13. Meanwhile, the pinion gears 27, 29 are restricted from moving in the axial direction by bottom faces 23a, 25a of the bores 23, 25 and an inner wall 7a of the cover 7.

Note, in a modification, the pinion gear 27 may be arranged so as to mesh with the pinion gear 29 outside the side gear 13 or on both sides of the side gears 11, 13.

According to the embodiment, the casing body 5 and the cover 7 are provided with a plurality of lubrication holes 31, 33, 35. At first, the cover 7 has four lubrication holes 31 each of which is arranged so as to oppose end faces of the meshing pinion gears 27, 29, as shown in FIG. 4. In detail, each of the lubrication hole 31 is positioned so that a center hole 31 generally coincides with an intermediate point between the bores 23, 25 in a view along the direction of IV of FIG. 3. Note, in other words, the intermediate point is identical to a meshing point C of the meshing pinion gears 27, 29. Preferably, a diameter of each lubrication hole 31 is established to be with in a range of 40 to 95 percent of an outer diameter of the pinion gear 27 (or the pinion gear 29). In this way, the respective meshing portions of the pinion gears 27, 29 communicate with the outside of the differential casing 3 through the lubrication holes 31.

Secondly, at the right end of each long bore 23, the lubrication hole 33 is defined for communicating the gear portion 27a of the pinion gear 27 accommodated in the bore 23 with the outside of the differential casing 3.

Thirdly, corresponding to the respective long pinion gears 27, four lubrication holes 35 are formed in the periphery of the casing body 5 so as to communicate with the bores 23, respectively, as shown in FIG. 4. Regarding a method of forming the above mentioned lubrication holes 31, 33, it should be noted that, the holes 31, 33 can be respectively obtained by a "mold-drawing" operation at the same time of casting of the cover 7 and the casing body 5.

In operation, the driving force transmitted from the engine to rotate the differential casing 3 is distributed into the left and right drive shafts through the pinion gears 27, 29 and the side gears 11, 13. At this time, if there is caused a difference in driving resistance between the right drive shaft and the left drive shaft, the driving force of the engine is distributed into the drive shafts differentially by rotations of the pinion gears 27, 29. Then, since the pinion gears 27, 29 are rotated while being urged against the bores 23, 25 by meshing reaction of the pinion gears 27, 29 with the side gears 11, 13, frictional resistance is caused in each sliding area. In addition, due to meshing thrust of the helical gears, fictional resistance is also produced between the end faces of the pinion gears 27, 29 and the bottom faces 23a, 25a of the bores 23, 25, between the opposite end faces of the pinion gears 27, 29 and the inner wall 7a of the cover 7 and between the side gears 11, 13 and the washers 14, 14. In this way, the differential limiting force can be realized by the above frictional resistance.

Then, due to the centrifugal pumping effect from the lubrication hole 31 through the lubrication hole 33 and the screw pumping effect by the helical gears' rotation for sucking the lubrication oil, plenty of oil is introduced into the meshing portions of the pinion gears 27, 29 in the differential casing 3 and the sliding portions of the end faces of the gears 27, 29, through the lubrication holes 31, 33. Note, this introduction of the lubrication oil is attained regardless of the rotating directions of the differential casing 3.

According to the embodiment, since each lubrication holes 31 is so arranged that a center thereof is in the vicinity of the meshing point of the pinion gears 27, 29, with the above establishment of the diameters of the lubrication holes, it is possible to introduce plenty of lubrication oil into the meshing portions of the pinion gears 27, 29 in the differential casing 3 and the sliding portions of the end faces of the gears 27, 29, through the lubrication holes 31 thereby to solve the problems of pitching and seizure.

Further, since the holes 31, 33 can be formed by drawing the cores in casting, the cost for manufacturing the differential apparatus can be reduced. Of course, the holes 31, 33 may be formed by mechanical processing in a modification. Since the lubrication holes 31 are formed in such a manner that respective radially inner portions 31a thereof are radially outside of an inner race 32 for holding the differential casing 3, it is possible to make use of the portions 31 as chucking grooves for engagement with a tool in removing the cover 7. In such a case, it is possible to delete an exclusive process for forming the chucking grooves in the conventional manufacturing processes. Although the lubrication holes 31 are formed in the only cover 7 in the embodiment, they may be provided in the casing body 5 or in both the cover 7 and the casing body 5 in a modification.

Figure 5:
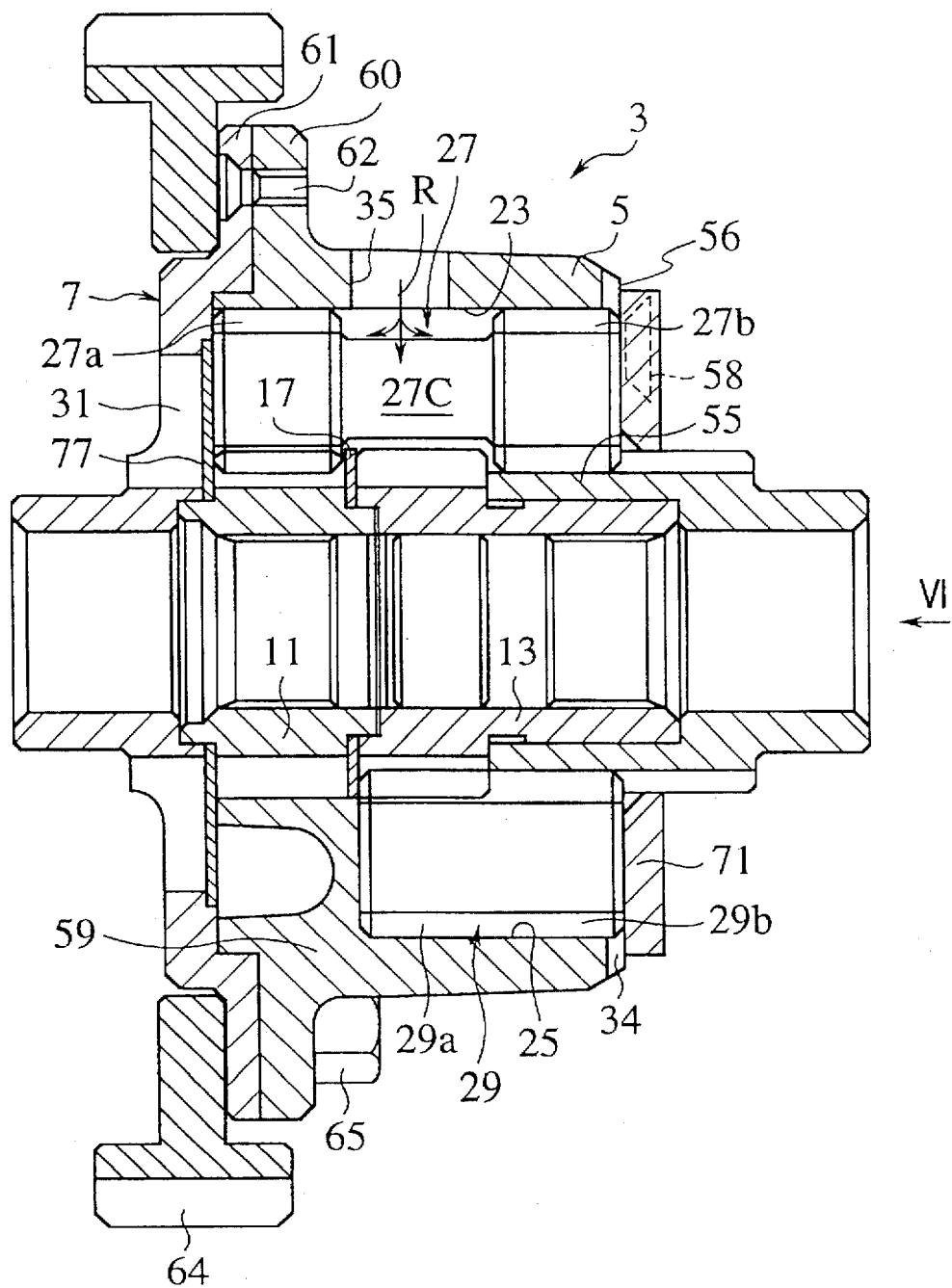
FIG. 5 is a cross sectional view showing a differential apparatus in accordance with a second embodiment of the present invention, taken along a line V—V of FIG. 6.
Figure 6:
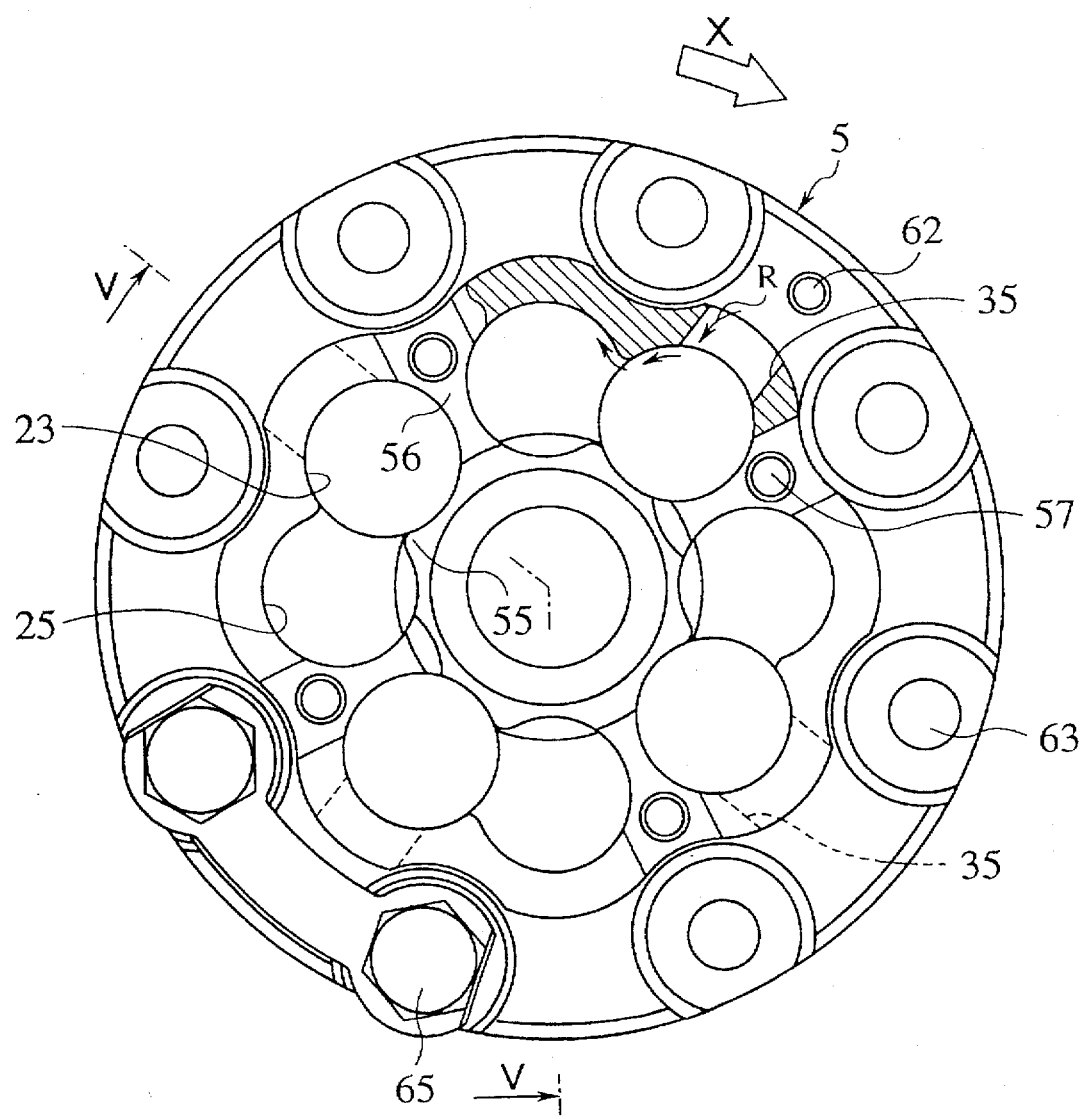
FIG. 6 is a side view of the differential apparatus, viewed from a direction of arrow VI of FIG. 5.

FIG. 5 is a cross sectional view of a differential apparatus in accordance with the second embodiment of the present invention and FIG. 6 is a side view of the differential apparatus viewed from a direction of arrow VI of FIG. 5. Note, in the figures, elements similar to those of the first embodiment are indicated with same reference numerals, respectively.

As shown in FIG. 5, the casing body 5 is provided with a convex portion 56 which protrudes from a side wall 55 to the right hand. Further, the convex portion 56 is provided with four screw holes 57 into which screw members 58 are screwed for fixing a disdike plate member 71 on the casing body 5. The first pinion gear 27 and the second pinion gear 29 are restricted from moving to the right-hand direction of FIG. 5 by the plate member 71.

A thrust washer 77 is disposed between the casing body 5 and the cover 7. The positioning of the pinion gear 27 in the left-hand direction is attained by the cover 7 through the intermediary of the thrust washer 77 while the positioning of the pinion gear 29 in the left hand direction is attained by a left wall portion 59 of the casing body 5.

Being provided with flanges 60, 61, respectively, the casing body 5 and the cover 7 are integrated with each other by means of screws 62 screwed into the flanges 60, 61.

As shown in FIG. 6, the flanges 60, 61 further includes eight bolt holes 63 formed to penetrate therethrough at intervals in the circumferential direction of the casing body 5. Each bolt hole 63 is arranged between the pinion gear 27 and the pinion gear 29 and between the adjoining pairs of pinion gears 27, 29. Arranged on the left side of the flange 61 in FIG. 5 is a ring gear 64 for receiving the power from the engine, which is fixed to the differential casing 3 by mounting bolts 65 passing through the bolt holes 63 of the flanges 60, 61.

The differential casing 3 is provided with the lubrication holes 31, 35 and a lubrication path 34 for introducing the lubrication oil enclosed in the differential carrier into the casing 3. The lubrication holes 35 are formed to extend in the radial direction of the casing body 5 and to communicate the outside of the casing body 5 with the respective bores 23.

According to the embodiment, each of the bores 23 that the lubrication holes 35 communicate is defined as one which rotates in advance of the adjoining bore 25 when the vehicle is traveling forward so that the casing body 5 is rotated in a direction X of FIG. 6. Further, in the axial direction of the differential apparatus, each of the holes 35 is so arranged to correspond to the reduced diametrical axle portion 27c of the first pinion gear 27 accommodated in the bore 23 for connecting the gear portion 27a with the gear portion 27b. With the above mentioned arrangement of the lubrication holes 35, the lubrication oil entering by the holes 35 can reach every part in the differential casing 3 without being obstructed from by obstacles such as the pinion gears 27, 29, the side gears 11, 13 or the like.

On the other hand, the lubrication holes 31 are so formed in the cover 7 as to correspond the pinion gears 27, 29, respectively. The lubrication path 34 is constituted by a clearance defined between the plate member 71 and the casing body 5. Both of the lubrication hole 31 and the path 34 communicate the outside of the differential casing 3 with bores 23, 25, so that the lubrication oil can be introduced into the differential casing 3.

The differential apparatus of the embodiment operates as follows.

When the vehicle is traveling straight on ahead, the first pinion gears 27 and the second pinion gears 29 do not rotate differently from each other since the side gears 11, 13 do not rotate differently from each other.

For example, in case that the side gear 11 is rotated faster than the side gear 13 in the vehicle's turning, the side gears 11, 13 and the pinion gears 27, 29 can rotate respectively thereby to facilitate the vehicle's turning.

We now describe an operation of the differential apparatus in case of slipping of a wheel on one side of the vehicle. For example, when the frictional coefficient between a tire on the side of the side gear 13 and a lead surface is smaller than that the frictional coefficient between another tire on the side of the side gear 11 and the load surface, the side gear 13 is to be rotated faster than the differential casing 3. Then, the pinion gears 27, 29 are urged against the bores 23, 25 corresponding to an input torque transmitted from the engine to the differential casing 3. Consequently, during the rotation of the pinion gears 27, 29, the respective teeth tips of the gears are slid on the inner walls of the bores 23, 25 frictionally, so that an action for restricting the rotation of the pinion gears 27, 29 is effected. Therefore, the differential rotation of the side gear 11, 13 is so restricted that the driving force can be also transmitted to the tire which is not slipping.

Hereat, since the lubrication holes 35 are formed so as to communicate with the bores 23 accommodating the pinion gears 27, the lubrication oil entered by the holes 35 flows in a direction of arrow R of FIG. 5 and lubricates the first pinion gears 27 and thereafter, the lubrication oil flows into the second Bore 25 by the centrifugal force of the differential casing 3 and lubricates the gears 29. The lubrication oil stored in the bores 23, 25 is supplied to the side gears 11, 13 by tooth surfaces of the pinion gears 27, 29 thereby to lubricate them. Therefore, it is possible to prevent the respective gears and the sliding areas from being seized, whereby the durability of the differential apparatus can be improved. Further, since the lubrication holes 35 are positioned in the vicinity of the axle potions 27c between the gear potions 27a and the gear portions 27b, it is possible to supply the lubrication oil to every part in the differential casing 3 without being obstructed by the pinion gears 27, 29, the side gears 11, 13 or the like. Thus, with an increased charge of the lubrication oil, it is possible to prevent the seizure in the respective gear portions and sliding areas in the differential casing 3, whereby the durability of the differential apparatus can be improved. Finally, it is to be understood that the preferred embodiment disclosed therein is by way of example only and is not intended to impose limitations on the present invention, reference being had for this purpose to the claims which follow.

What is claimed is:

1. A differential apparatus comprising:

a differential casing (3) rotatable about an axis;

a pair of helical side gears (11, 13) arranged in the differential casing (3) so as to be individually rotatable about said axis;

a pair of axially extending bores (23, 25) formed in a body portion (5) of the differential casing (3) so as to revolve around the side gears as the differential casing rotates;

a pair of mutually meshing helical pinions (27, 29) slidably rotatably fitted respectively in the bores (23, 25), the helical pinions having rotational axes fixed in relation to the differential casing and engaged respectively with the side gears (11, 13); and a lubrication hole (31) formed through a radially extending side portion (7) of the differential casing (3) at a region always coinciding with a mutual meshing point between axial ends of the pinions (27, 29), the lubrication hole communicating with outside of the differential casing (3) whereby a screw pumping effect by rotation of the meshing pinions sucks lubricant through the lubrication hole from outside the differential casing to introduce that lubricant into the differential casing at the mutual meshing point;

so as to forcibly circulate the lubricant inside the casing.

2. A differential apparatus according to claim 1, wherein said mutual meshing point is axially offset from a region in which the pinions (27, 29) mesh with the side gears (11, 13).

3. A differential apparatus according to claim 1, wherein said lubrication hole (31) has a smaller diameter than any of the pinions (27, 29).

4. A differential apparatus for use in a vehicle, the apparatus comprising:

a differential casing (3) rotatable about an axis;

a pair of side gears (11, 13) arranged in the differential casing (3) so as to be individually rotatable about said axis;

a pair of mutually communicating bores (23, 25) formed in a body portion (5) of the differential casing (3) so that either (23) of the bores has an advanced phase relative to the other bore (25), as the vehicle travels;

a pair of mutually meshing pinions (27, 29) slidably rotatably fitted respectively in the bores (23, 25) and engaged respectively with the side gears (11, 13), the pinions having rotational axes fixed in relation to the differential casing;

a lubrication hole (35) formed through the body portion of the differential casing (3) at a position thereon for having an inside region of either bore always communicating with outside the differential casing (3), whereby a pumping effect by rotation of the meshing pinions forces a circulation of lubricant through the lubrication hole from outside the differential casing, so as to forcibly circulate the lubricant inside the differential casing; and another lubrication hole (31) formed through a side portion (7) of the differential casing (3) at a region substantially coinciding with a mutual meshing point between the pinions (27, 29) to communicate with outside of the differential casing, so as to provide another path for introducing the lubricant into the differential casing.

* * * * *

UNITED STATES PATENT AND TRADEMARK OFFICE
CERTIFICATE OF CORRECTION

PATENT NO. : 5,711,737

DATED : January 27, 1998

INVENTOR(S) : MASAO TERAOKA, ET AL.

It is certified that error appears in the above-identified patent and that said Letters Patent is hereby corrected as shown below:

On the title page, item [30], In the "Foreign Application Priority Data", the filing date of JP 6-274825 should read--Nov. 9, 1994--.

Signed and Sealed this

Twenty-sixth Day of May, 1998

Attest:

BRUCE LEHMAN

Attesting Officer     Commissioner of Patents and Trademarks